(12) United States Patent
Brahim et al.

(10) Patent No.: US 9,132,443 B2
(45) Date of Patent: Sep. 15, 2015

(54) FIXING RING AND A FLUID PRODUCT DISPENSER USING SUCH A RING

(75) Inventors: Xavier Brahim, Conches en Ouche (FR); Olivier Lecomte, Saint Lucien (FR)

(73) Assignee: APTAR FRANCE SAS, Le Neubourg (FR)

( * ) Notice: Subject to any disclaimer, the term of this patent is extended or adjusted under 35 U.S.C. 154(b) by 1 day.

(21) Appl. No.: 14/112,752

(22) PCT Filed: May 21, 2012

(86) PCT No.: PCT/FR2012/051126
§ 371 (c)(1),
(2), (4) Date: Oct. 18, 2013

(87) PCT Pub. No.: WO2012/160302
PCT Pub. Date: Nov. 29, 2012

(65) Prior Publication Data
US 2014/0042189 A1 Feb. 13, 2014

(30) Foreign Application Priority Data

May 23, 2011 (FR) ..................................... 11 54470

(51) Int. Cl.
*B65D 88/54* (2006.01)
*B05B 15/06* (2006.01)
(Continued)

(52) U.S. Cl.
CPC ............ *B05B 15/065* (2013.01); *B05B 11/3047* (2013.01); *F16L 21/08* (2013.01); *B65D 83/205* (2013.01); *B65D 83/38* (2013.01)

(58) Field of Classification Search
CPC ............ B05B 11/3047; B05B 11/3049; B05B 11/3059; B05B 11/3001; B05B 11/001; B65D 83/205; B65D 2215/04; B65B 3/04

USPC ............... 222/321.1, 321.6–321.9, 320, 384, 222/383.1, 385, 153.09, 153.16, 153.11, 222/153.14; 220/724, 725, 726, 784
See application file for complete search history.

(56) References Cited

U.S. PATENT DOCUMENTS 3,229,864 A * 1/1966 Eberhard .................... 222/321.7
3,362,344 A * 1/1968 Duda ............................ 417/514
(Continued)

FOREIGN PATENT DOCUMENTS

| FR | 2 737 471 A1 | 2/1997 |
| FR | 2 769 860 A1 | 4/1999 |

(Continued)

OTHER PUBLICATIONS

English translation of the International Preliminary Report on Patentability for PCT/FR2012/051126.

*Primary Examiner* — Paul R Durand
*Assistant Examiner* — Randall Gruby
(74) *Attorney, Agent, or Firm* — Sughrue Mion, PLLC

(57) ABSTRACT

A fastener ring for fastening a dispenser member, such as a pump or a valve, on a neck of a reservoir, the ring including a reception mechanism suitable for receiving the dispenser member, and a substantially-cylindrical attachment skirt for coming into engagement around the neck of the reservoir. The skirt defining an inner wall that defines a top first inner wall section for coming into engagement with the neck, and a bottom second inner wall section for extending out of contact with the neck. The attachment skirt includes an orientation tab that interrupts the bottom second inner wall section and that projects radially inwards relative to the second section.

21 Claims, 2 Drawing Sheets

(51) Int. Cl.
  *B05B 11/00*   (2006.01)
  *F16L 21/08*   (2006.01)
  *B65D 83/20*    (2006.01)
  *B65D 83/38*    (2006.01)

(56) References Cited

U.S. PATENT DOCUMENTS

| | | | | |
|---|---|---|---|---|
| 3,422,996 | A * | 1/1969 | Lipman | 222/402.11 |
| 3,746,261 | A * | 7/1973 | Nozawa et al. | 239/333 |
| 4,241,856 | A * | 12/1980 | Otterson | 222/539 |
| 4,572,410 | A * | 2/1986 | Brunet | 222/402.11 |
| 4,770,323 | A * | 9/1988 | Debard | 222/82 |
| 4,889,262 | A * | 12/1989 | Toms | 222/153.13 |
| 4,984,702 | A * | 1/1991 | Pierpont | 215/272 |
| 5,772,080 | A * | 6/1998 | de Pous et al. | 222/321.7 |
| 5,918,774 | A * | 7/1999 | Lund et al. | 222/153.13 |
| 5,941,428 | A * | 8/1999 | Behar et al. | 222/321.7 |
| 6,186,359 | B1 * | 2/2001 | de Pous et al. | 222/1 |
| 6,290,103 | B1 * | 9/2001 | Fraillon | 222/321.1 |
| 7,032,783 | B1 * | 4/2006 | Kamp et al. | 222/321.9 |
| 8,267,285 | B2 * | 9/2012 | Cohen et al. | 222/321.7 |
| 8,430,277 | B2 * | 4/2013 | Dumont et al. | 222/402.1 |
| 8,544,690 | B2 * | 10/2013 | Garcia et al. | 222/147 |
| 2002/0104853 | A1 | 8/2002 | Rosa | |
| 2002/0145005 | A1 * | 10/2002 | Sanchez | 222/1 |
| 2003/0106901 | A1 * | 6/2003 | Meshberg | 222/1 |
| 2004/0124212 | A1 * | 7/2004 | Masuda | 222/183 |
| 2005/0061834 | A1 * | 3/2005 | Garcia et al. | 222/321.7 |
| 2007/0246484 | A1 * | 10/2007 | Yoshida et al. | 222/153.13 |
| 2009/0302062 | A1 * | 12/2009 | Maddy | 222/183 |
| 2010/0199606 | A1 * | 8/2010 | Behar et al. | 53/432 |
| 2011/0108579 | A1 * | 5/2011 | Martorell Pena et al. | 222/321.1 |
| 2012/0061422 | A1 * | 3/2012 | Beranger et al. | 222/321.1 |
| 2012/0061423 | A1 * | 3/2012 | Muller et al. | 222/321.1 |
| 2012/0068030 | A1 * | 3/2012 | Behar | 248/224.7 |
| 2012/0223103 | A1 * | 9/2012 | Moreau | 222/153.06 |
| 2012/0285991 | A1 * | 11/2012 | Muller | 222/113 |
| 2012/0318825 | A1 * | 12/2012 | Beranger et al. | 222/321.1 |
| 2013/0026186 | A1 * | 1/2013 | Jenkins | 222/153.13 |
| 2013/0118641 | A1 * | 5/2013 | Beranger | 141/363 |
| 2014/0061149 | A1 * | 3/2014 | Goldberg et al. | 215/208 |
| 2014/0175128 | A1 * | 6/2014 | Croibier et al. | 222/321.1 |

FOREIGN PATENT DOCUMENTS

| | | |
|---|---|---|
| FR | 2 908 117 A1 | 5/2008 |
| FR | 2 918 964 A1 | 1/2009 |

\* cited by examiner

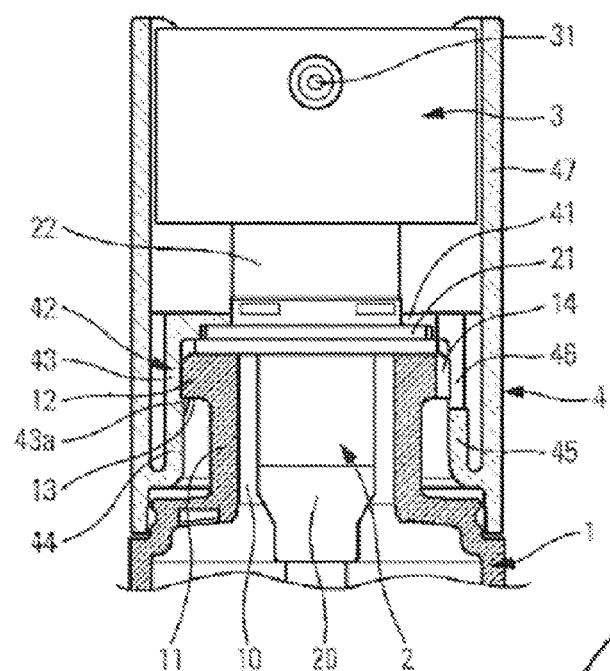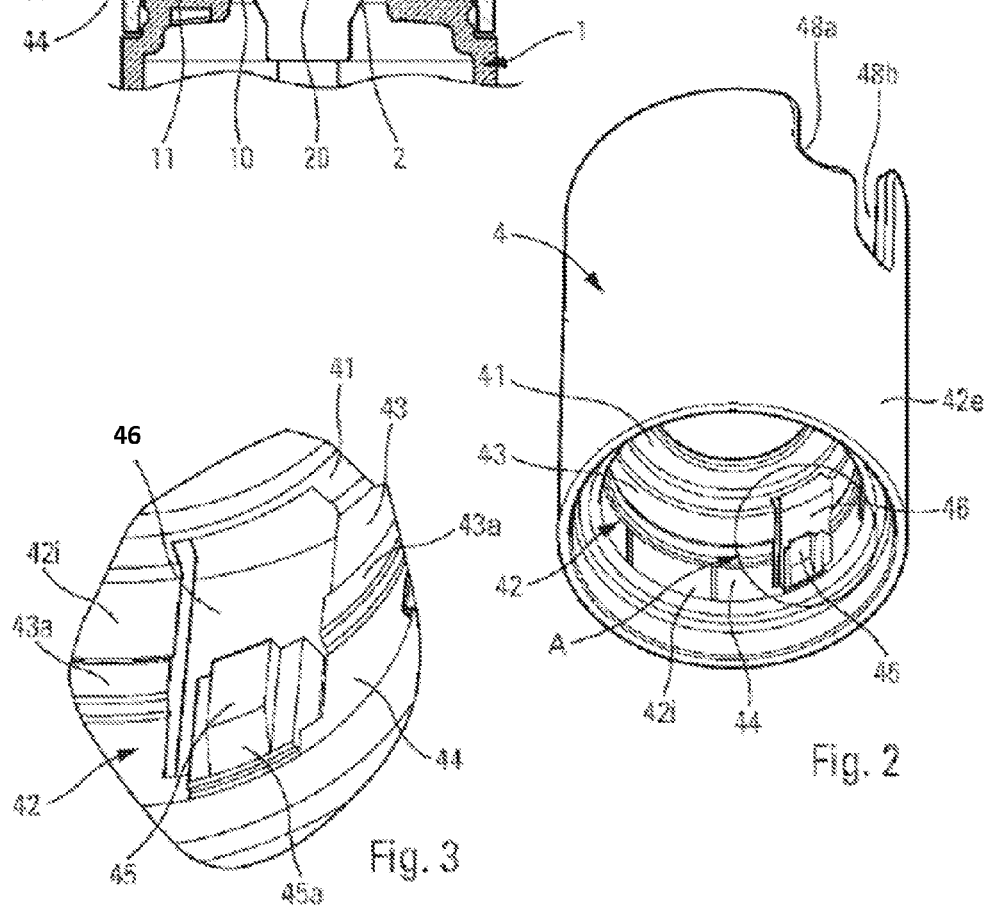

FIXING RING AND A FLUID PRODUCT DISPENSER USING SUCH A RING

CROSS REFERENCE TO RELATED APPLICATIONS

This application is a National Stage of International Application No. PCT/FR2012/051126 filed May 21, 2012, claiming priority based on French Patent Application No. 1154470 filed May 23, 2011, the contents of all of which are incorporated herein by reference in their entirety.

The present invention relates to a fastener ring for fastening a dispenser member, such as a pump or a valve, on a neck of a reservoir. The fastener ring includes reception means that are suitable for receiving the pump or the valve, and an attachment skirt for coming into engagement around the neck of the reservoir. Such a fastener ring is frequently used in the fields of perfumery, cosmetics, and pharmacy for fastening pumps or valves on reservoir necks so as to constitute fluid dispensers.

In general, the neck of the reservoir forms outer annular attachment reinforcement that projects radially outwards. The attachment skirt of the fastener ring presents a configuration that is suitable for enabling attachment around and/or below the annular reinforcement of the neck of the reservoir. Conventionally, the annular reinforcement is situated in the top portion of the neck, such that the bottom portion presents a smaller diameter. As a result, the fastener ring conventionally includes an inner wall that defines a greater first wall section that comes into engagement with the annular reinforcement of the neck, and a smaller second inner wall section that extends below the annular reinforcement out of contact with the neck. In other words, the smaller second wall section extends around the neck, being spaced apart from said neck by a cylindrical gap. However, the bottom end of the second section could alternatively come into contact with the reservoir. This design is entirely conventional for a fluid dispenser using a fastener ring for fastening a pump or a valve in the neck of a reservoir.

Naturally, in order to complete the dispenser, the pump or the valve is provided with a pusher that is axially movable down and up, and on which the user may press by means of one or more fingers. By moving the pusher axially, fluid is dispensed in optionally metered form. In general, the pusher includes a dispenser orifice, e.g. in the form of a nozzle, that is situated on a side wall of the pusher. Consequently, the dispenser orifice presents an angular orientation relative to the reservoir.

For some fluid dispensers, it is advantageous, necessary, or essential, for the angular orientation of the dispenser orifice relative to the reservoir to be unchanging. To do this, it is already known to use the fastener ring in order to determine the orientation of the dispenser orifice, as in document FR 2 737 471, for example. That document describes a fastener ring including double indexing for determining the angular position of the nozzle of the pusher relative to the container. To do this, the fastener ring includes a notch in its top portion so as to prevent the nozzle from turning, and a notch in its bottom portion so as to determine the orientation of the ring relative to the reservoir, which reservoir includes an indexer lug that co-operates with the bottom notch. In this way, the fastener ring is orientated relative to the reservoir, and the pusher is orientated relative to the fastener ring. More precisely, the bottom portion of the fastener ring is formed by a conventional attachment skirt that defines attachment profiles for coming into engagement below the annular reinforcement of the neck. The skirt is constituted by a plurality of flexible tabs that are arranged side by side. In order to make the bottom notch, a tab is eliminated. The fastener ring must be orientated in such a manner that the bottom notch is in axially alignment with the indexer lug formed below the annular reinforcement of the neck. The fastener ring thus has an orientation that is unique since the tabs of the skirt cannot co-operate with the indexer lug of the neck. That angular orientation system is indeed effective, but it does not enable a conventional fastener ring to be used on the particular neck provided with the indexer lug. In other words, the container cannot be standardized, given that it must always be associated with the fastener ring provided with the bottom notch.

An object of the present invention is to remedy the above-mentioned drawback of the prior art by defining a fastener ring that makes it possible to determine the angular position of the dispenser orifice of the pusher, but that can be mounted on any type of neck, regardless of whether it is standard or specially designed for determining angular position.

To do this, the present invention provides a fastener ring for fastening a dispenser member, such as a pump or a valve, on a neck of a reservoir, the ring including reception means that are suitable for receiving the dispenser member, and a substantially-cylindrical attachment skirt for coming into engagement around the neck of the reservoir, the skirt defining an inner wall that defines a top first inner wall section for coming into engagement with the neck in the final assembled position, and a bottom second inner wall section for extending out of contact with the neck in the final assembled position, the fastener ring being characterized in that the attachment skirt includes an orientation tab that interrupts the bottom second inner wall section and that projects radially inwards relative to the second section in the final assembled position out of contact with the neck. Whereas the indexing of the ring on the neck in document FR 2 737 471 is achieved by a notch formed by a missing fastener tab, the indexing of the present invention is achieved by an orientation tab that projects radially inwards. The tab co-operates with an axial orientation groove that is formed in the neck, as described below.

In an advantageous embodiment, the orientation tab is flexible in such a manner as to be movable resiliently relative to the second inner wall section. In this way, even if the orientation tab projects radially inwards, the attachment skirt may be mounted on any neck by temporarily deforming the orientation tab so as to enable it to pass over the conventional annular reinforcement of the neck of the reservoir. It is thus possible to use the fastener ring of the invention on any conventional neck, and naturally on the neck of the invention that is specially designed to determine angular orientation.

In another aspect of the invention, the orientation tab extends only over the second inner wall section. Thus, the orientation tab does not come into engagement with the neck once the ring is mounted on the neck. In this way, the orientation tab is completely without effect on a conventional reservoir neck. While on a neck of the invention that is specially designed to determine angular orientation, the orientation tab makes it possible to index the ring relative to the neck, but without interfering with the neck once the fastener ring is in its final assembled position.

In a practical embodiment, the orientation tab extends into a window that is formed in the skirt, the window extending over at least the second inner wall section. The window makes it possible to impart flexibility to the orientation tab by providing an empty space around it. For example, the orientation tab extends freely upwards towards the first inner wall section. The orientation tab is thus fastened to the remainder of the ring at the bottom edge of the window.

In another advantageous aspect of the present invention, the attachment skirt includes an outer wall, the orientation tab being offset radially inwards relative to the outer wall of the skirt. In this way, the orientation tab may be deformed radially outwards so as to pass over the annular reinforcement, but without going beyond the space occupied by the skirt defined by its outer wall. The inward offset of the orientation tab thus makes it possible to form clearance for the tab when it is deformed outwards while the annular reinforcement of the neck is passing thereover.

Thus, the orientation tab may present a wall thickness that is substantially identical to the wall thickness of the skirt at the bottom second wall section, but the orientation tab is offset radially inwards so as to project inwards relative to the inner wall of the skirt, and so as to be offset inwards relative to the outer wall of the skirt.

The present invention also defines a fluid dispenser comprising: a fluid reservoir including a neck that defines an opening, the neck forming outer annular attachment reinforcement; a dispenser member, such as a pump or a valve; and a fastener ring as defined above for fastening the dispenser member in the opening of the neck, the top first inner wall section coming into engagement with the outer annular attachment reinforcement of the neck, and the bottom second inner wall section extending below the outer annular attachment reinforcement out of contact with the neck, the orientation tab extending out of contact with the neck in the final assembled position. Advantageously, the outer annular attachment reinforcement forms an axial orientation groove in which the orientation tab passes substantially without deforming while the skirt is being mounted around the neck. The advantage of the axial orientation groove compared to the indexer lug of document FR 2 737 471 is that it does not interfere with fastening the ring on the neck. It is possible to use a conventional fastener ring on such a neck, without that adversely affecting the fastening of the ring. The fluid reservoir with a grooved neck of the invention may constitute a standard reservoir on which it is possible to mount fastener rings that are conventional or that are of the invention. In an aspect of the invention, the orientation tab is positioned below and out of contact with the attachment reinforcement when the ring is mounted on the neck in the final assembled position. Thus, the orientation tab enables the ring to be indexed angularly relative to the neck of the reservoir, but does not come into engagement with the neck of the reservoir once the ring is mounted on the neck. This enables the fastener ring of the invention to be used on any neck, regardless of whether the neck is provided with an axial orientation groove.

According to another characteristic of the invention, the first inner wall section includes an attachment profile that becomes housed below the attachment reinforcement when the ring is mounted on the neck in its final assembled position.

The spirit of the invention resides in the fact that the fastener ring and the reservoir constitute universal component elements that enable the angular orientation of the ring on the neck to be determined when they co-operate, but they may also be used individually with standard elements. The orientation tab of the ring makes it possible to determine the orientation of the ring on the neck, but does not prevent the ring from being mounted on a conventional neck. In addition, the particular neck of the reservoir with its axial orientation groove makes it possible to orientate the fastener ring of the invention, but may also be associated with a standard fastener ring that is not provided with an orientation tab. The flexibility of the orientation tab enables it to pass over the annular reinforcement of a standard reservoir neck, or of the neck of the reservoir of the invention. This means that the fastener ring of the invention and the reservoir of the invention constitute standard elements that, depending on the selected application, need not be associated with each other, or alternatively may be associated with each other so as to determine the orientation of the pusher. This is not the situation in prior-art document FR 2 737 471 in which the fastener ring can be mounted on the neck of the reservoir only with an imposed orientation. It should also be observed that the fastener ring may be mounted on the neck of the reservoir in automated or manual manner.

The invention is described more fully below with reference to the accompanying drawings, which show an embodiment of the invention by way of non-limiting example.

In the figures:

FIG. 1 is a vertical section view through a fluid dispenser in an embodiment of the invention;

FIG. 2 is a perspective view slightly from below of the fastener ring of the invention;

FIG. 3 is a larger-scale perspective view of a detail A of FIG. 2; and

Figure 4A:
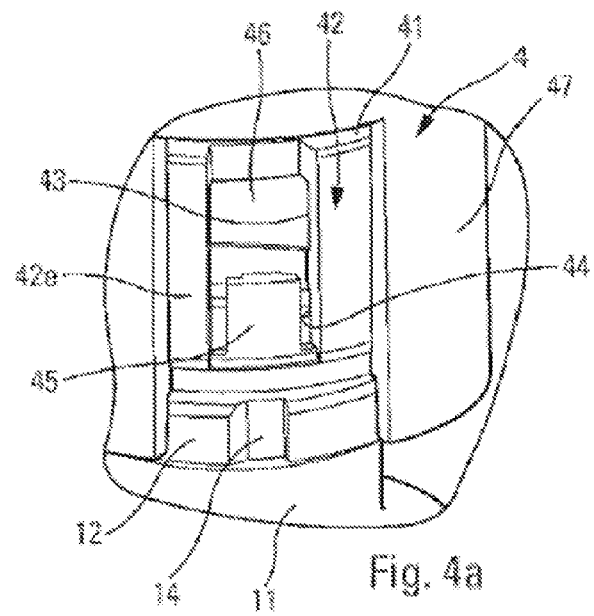
Figure 4B:
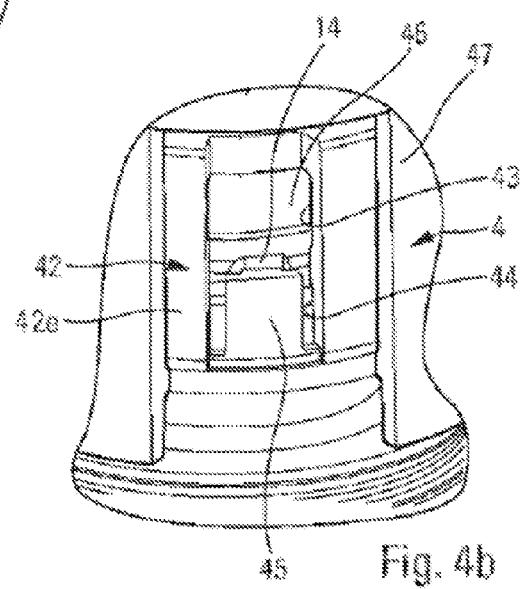
Figure 4C:
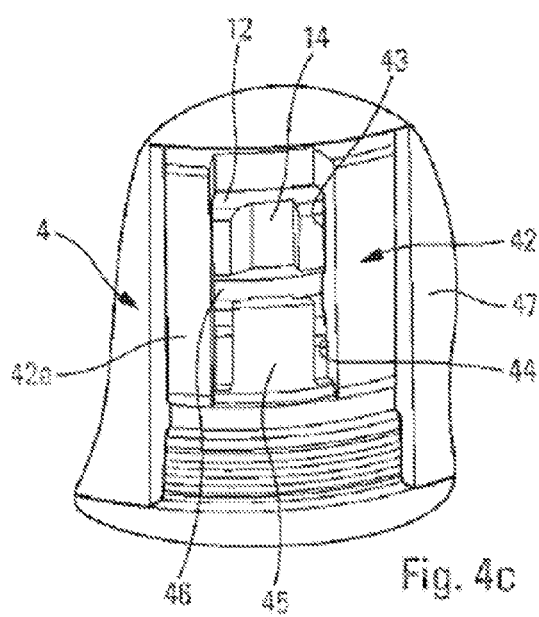

FIGS. 4a, 4b, and 4c are larger-scale cut-away perspective views seeking to illustrate the operation of mounting the fastener ring of the invention on a reservoir neck of the invention.

Reference is made firstly to FIG. 1 for a general description of the component elements of a fluid dispenser of the invention. The dispenser comprises a fluid reservoir 1, a dispenser member 2, a pusher 3, and a fastener ring 4.

The reservoir 1 includes a neck 11 that defines an opening 10 that puts the inside of the reservoir into communication with the outside. The neck 11 is provided with outer annular attachment reinforcement 12 that projects radially outwards in the proximity of the top end of the neck. In this way, the annular reinforcement 12 defines a bottom shoulder 13 that is directed downwards. In other words, the neck 11 defines two different outer diameters, namely a maximum diameter at the annular reinforcement 12, and a minimum diameter at the bottom portion of the neck 11. The two diameters being interconnected via the shoulder 13. According to a characteristic of the invention, the annular reinforcement 12 forms an axial orientation groove 14 that extends over the entire height of the reinforcement 12, as can be seen in FIG. 1. The axial groove 14 is also visible in FIGS. 4a to 4c. In the embodiment used to illustrate the present invention, there is only a single axial orientation groove 14, but the neck could include a plurality of axial grooves without going beyond the ambit of the invention. The fluid reservoir 1 may be made of any appropriate material, e.g. glass, appropriate plastics material, or even metal.

The dispenser member 2 may be a pump or a valve comprising a body 20 defining a fastener collar 21, and an actuator rod 22 on which there is mounted the pusher 3 that forms a lateral dispenser orifice 31. In entirely conventional manner, by pressing on the pusher 3, the actuator rod 22 is driven into the body 2, and fluid is thus dispensed through the dispenser orifice 31. The body 20 of the dispenser member 2 is held in stationary manner inside the opening 10 of the neck 11 by the fastener collar 21.

The conventional function of the fastener ring 4 is to hold the dispenser member 2 firmly and in leaktight manner in the neck 11 of the reservoir. To do this, the fastener ring comprises reception means 41 for receiving the fastener collar 21 of the dispenser member 2, and an attachment skirt 42 that comes into engagement around the neck 11. In the embodiment used to illustrate the present invention, the fastener ring 4 further comprises, in optional manner, a covering hoop 47 that surrounds the attachment skirt 42 in coaxial manner. An annular gap is also defined between the skirt 42 and the hoop 47.

Reference is made below to FIGS. 2 and 3 in order to describe in detail the fastener ring 4. The attachment skirt 42 includes an outer wall 42e and an inner wall 42i. At the inner wall 42i, the skirt defines a top first inner wall section 43 and a bottom second inner wall section 44 that are arranged axially one above the other. The top first section 43 is for coming into engagement with the annular reinforcement 12 of the neck 11 in the final assembled position, while the bottom second section 44 extends below the annular reinforcement 12 around the neck 11 in the final assembled position, remaining out of contact with the neck however. As a result, a cylindrical annular gap is defined between the bottom second section 44 and the neck 11, as can be seen clearly in FIG. 1. The bottom end of the bottom section 44 may even come into contact with the reservoir. It should also be observed that the top first section 43 forms an attachment profile 43a for becoming housed, e.g. by snap-fastening, below the shoulder 13 formed by the annular reinforcement 12. In this way, the attachment skirt 42 is held in completely stable manner around the neck 11. This characteristic is conventional for a fastener ring in the fields of perfumery, cosmetics, and pharmacy.

In the invention, the attachment skirt 42 is provided with an orientation tab 45 that is formed at the bottom second section 44. The tab 45 is connected via its bottom end to the remainder of the ring, such that it presents a certain amount of flexibility that enables elastic deformation. The tab 45 is formed at a window 46 that extends at the bottom second section 44, and optionally also at the top first section 43. The window 46 may even extend up to the reception means 41 for the purpose of making molding easier. The orientation tab 45 projects radially inwards relative to the bottom second section 44, such that in the final assembled position, as shown in FIG. 1, the tab 45 extends a little below and out of contact with the annular reinforcement 12. Advantageously, the orientation tab 45 is also offset inwards relative to the outer wall 42e of the skirt, as can be seen in FIGS. 4a to 4c. This inward offset makes it possible to form clearance that enables the tab to be deformed radially outwards without going beyond the space occupied by the skirt. This characteristic is advantageous, in particular when the attachment skirt is associated with an outer hoop that becomes clamped around the skirt, replacing the integrated hoop 47.

With reference once again to FIG. 1, it can be seen that the orientation tab 45 is arranged axially below the axial orientation groove 14 of the neck 11 in the final assembled position of the ring on the neck of the reservoir.

Reference is made below to FIGS. 4a to 4c in order to describe in detail an operation of mounting a ring of the invention on a reservoir of the invention. In the figures, the covering hoop 47 is cut away so as to allow the orientation tab 45 and the neck 11 to be seen. In FIG. 4a, the fastener ring 4 is arranged above the neck 11, with the orientation tab 45 already axially in alignment with the axial orientation groove 14. By lowering the fastener ring 4 axially, the FIG. 4b position is reached in which it can be seen that the orientation tab 45 is engaged in the orientation groove 14. The bottom second section 44 is thus situated at the annular reinforcement 12. The orientation tab 45 can pass through the axial groove 14 while deforming very little, if at all. It can easily be understood that the passage of the tab 45 in the groove 14 imposes the angular orientation of the ring relative to the neck, or vice versa. By continuing to lower the fastener ring 4 axially on the neck 11 of the reservoir, the final assembled position shown in FIG. 4c is reached. The orientation tab 45 is thus arranged axially below the annular reinforcement 12, in alignment with the axial groove 14. The top first section 43 of the skirt is thus in engagement with the annular reinforcement 12. The orientation tab 45 thus extends freely without any constraint, since it is not in contact with the neck 11. Although the tab 45 is no longer engaged in the orientation groove 14, the orientation of the ring relative to the reservoir is determined by the fastening formed between the top first section 43 and the annular reinforcement 12 of the neck.

The fastener ring 4 is thus positioned angularly in precise and imposed manner relative to the reservoir. In addition, the pusher 3 is also orientated angularly relative to the fastener ring 4, e.g. by means of notches 48a, 48b formed at the top edge of the hoop 47, and in which the dispenser orifice 31 is engaged. When the dispenser orifice 31 is in the notch 48a, the pusher is completely prevented from moving, both axially and in turning, and when the dispenser orifice 31 is in the deeper notch 48b, the pusher can be moved axially so as to enable fluid to be dispensed, but it is still prevented from turning. This is merely one non-limiting embodiment that makes it possible to impose the angular orientation of the pusher relative to the fastener ring 4. Other well-known prior-art means exist.

As described above, by means of the fastener ring and the reservoir of the invention, it is possible to determine the angular orientation of the fastener ring relative to the reservoir. However, as a result of the flexibility of the orientation tab 45, it is possible to mount the fastener ring of the invention on a conventional reservoir having a neck that does not have any axial orientation groove, and even on the reservoir of the invention away from the axial groove. The flexibility of the tab enables it to deform radially outwards at the annular reinforcement, and then to relax so as to reach its final position below and out of contact with the reinforcement, as shown in FIG. 1. Passing the tab 45 over the annular reinforcement 12 is also facilitated by a bottom bevel 45a that makes it possible to avoid any hard abutment of the tab 45 against the top edge of the neck.

Conversely, it is also possible to mount a conventional fastener ring without an orientation tab on a neck of the invention that is provided with one or more axial orientation grooves 14. The orientation groove 14 is formed in the annular reinforcement 12 and does not impede a conventional fastener ring becoming engaged below the shoulder 13, which engagement is interrupted only very locally at the groove 14. As a result, the fastener ring 4 and the reservoir 1 of the invention may not only co-operate with each other, but they may also co-operate with standard elements.

The invention claimed is:

1. A fastener ring for fastening a dispenser member on a neck of a reservoir, the ring including reception means for receiving the dispenser member, and an attachment skirt for coming into engagement around the neck of the reservoir, the skirt defining an inner wall that defines a top first inner wall section for coming into engagement with the neck in a final assembled position, and a bottom second inner wall section for extending out of contact with the neck in the final assembled position, wherein the attachment skirt includes an angular orientation tab that is distinct from the top first section, the angular orientation tab interrupting the bottom second inner wall section and projecting radially inwards relative to the second section, the angular orientation tab, in the final assembled position, being out of contact with the neck; and wherein the orientation tab is flexible so as to be movable resiliently relative to the second inner wall section.

2. A fastener ring according to claim 1, wherein the orientation tab extends only over the second inner wall section.

3. A fastener ring according to claim 1, wherein the orientation tab extends into a window that is formed in the skirt, the window extending over at least the second inner wall section.

4. A fastener ring according to claim 1, wherein the orientation tab extends freely upwards towards the first inner wall section.

5. A fastener ring according to claim 1, wherein the attachment skirt includes an outer wall, the orientation tab being offset radially inwards relative to the outer wall of the skirt.

6. The fastener ring according to claim 1, wherein the attachment skirt is cylindrical.

7. The fastener ring according to claim 1, wherein the dispenser member is a pump or a valve.

8. A fluid dispenser comprising:
   a fluid reservoir including a neck that defines an opening, the neck forming an outer annular attachment reinforcement;
   a dispenser member; and
   a fastener ring according to claim 1 fastening the dispenser member in the opening of the neck, the top first inner wall section coming into engagement with the outer annular attachment reinforcement of the neck, and the bottom second inner wall section extending below the outer annular attachment reinforcement out of contact with the neck, the orientation tab extending out of contact with the neck in the final assembled position.

9. A dispenser according to claim 8, wherein the outer annular attachment reinforcement forms an axial orientation groove allowing the orientation tab to pass without deforming while mounting the skirt around the neck.

10. A dispenser according to claim 8, wherein the orientation tab is positioned below and out of contact with the attachment reinforcement in the final assembled position.

11. A dispenser according to claim 8, wherein the first inner wall section includes an attachment profile that is housed below the attachment reinforcement in the final assembled position.

12. A dispenser according to claim 8, wherein the orientation tab extends into a window that is formed in the skirt, the window extending up to the attachment reinforcement.

13. The dispenser according to claim 8, wherein the outer annular attachment reinforcement forms an axial orientation groove in which the orientation tab passes while temporarily deforming while the skirt is being mounted around the neck.

14. A fastener ring for fastening a dispenser member on a neck of a reservoir, the ring including reception means for receiving the dispenser member, and an attachment skirt for coming into engagement around the neck of the reservoir, the skirt defining an inner wall that defines a top first inner wall section for coming into engagement with the neck in a final assembled position, and a bottom second inner wall section for extending out of contact with the neck in the final assembled position, wherein the attachment skirt includes an angular orientation tab that is distinct from the top first section, the angular orientation tab interrupting the bottom second inner wall section and projecting radially inwards relative to the second section, the angular orientation tab, in the final assembled position, being out of contact with the neck; and wherein the orientation tab extends into a window that is formed in the skirt, the window extending over at least the second inner wall section.

15. The fastener ring according to claim 14, wherein the orientation tab extends only over the second inner wall section.

16. The fastener ring according to claim 14, wherein the orientation tab extends freely upwards towards the first inner wall section.

17. A fluid dispenser comprising:
   a fluid reservoir including a neck that defines an opening, the neck forming an outer annular attachment reinforcement;
   a dispenser member; and
   a fastener ring according to claim 14 fastening the dispenser member in the opening of the neck, the top first inner wall section coming into engagement with the outer annular attachment reinforcement of the neck, and the bottom second inner wall section extending below the outer annular attachment reinforcement out of contact with the neck, the orientation tab extending out of contact with the neck in the final assembled position.

18. A fastener ring for fastening a dispenser member on a neck of a reservoir, the ring including reception means for receiving the dispenser member, and an attachment skirt for coming into engagement around the neck of the reservoir, the skirt defining an inner wall that defines a top first inner wall section for coming into engagement with the neck in a final assembled position, and a bottom second inner wall section for extending out of contact with the neck in the final assembled position, wherein the attachment skirt includes an angular orientation tab that is distinct from the top first section, the angular orientation tab interrupting the bottom second inner wall section and projecting radially inwards relative to the second section, the angular orientation tab, in the final assembled position, being out of contact with the neck; and wherein the attachment skirt includes an outer wall, the orientation tab being offset radially inwards relative to the outer wall of the skirt.

19. The fastener ring according to claim 18, wherein the orientation tab extends only over the second inner wall section.

20. The fastener ring according to claim 18, wherein the orientation tab extends freely upwards towards the first inner wall section.

21. A fluid dispenser comprising:
   a fluid reservoir including a neck that defines an opening, the neck forming an outer annular attachment reinforcement;
   a dispenser member; and
   a fastener ring according to claim 18 fastening the dispenser member in the opening of the neck, the top first inner wall section coming into engagement with the outer annular attachment reinforcement of the neck, and the bottom second inner wall section extending below the outer annular attachment reinforcement out of contact with the neck, the orientation tab extending out of contact with the neck in the final assembled position.

* * * * *